June 21, 1966 P. M. BIZOUARD ETAL 3,257,601
POLYPHASE SIGNAL GENERATING CIRCUIT
Filed May 15, 1962 2 Sheets-Sheet 1

INVENTORS:
PAUL MARIE BIZOUARD
ALAIN GILBERT ALBERT BAZIN
BY: George H. Spencer
ATTORNEY

United States Patent Office 3,257,601
Patented June 21, 1966

3,257,601
POLYPHASE SIGNAL GENERATING CIRCUIT
Paul Marie Bizouard, Charenton, and Alain Gilbert Albert Bazin, Paris, France, assignors to Compagnie Des Compteurs, Paris, France, a company of France
Filed May 15, 1962, Ser. No. 194,944
Claims priority, application France, May 19, 1961, 862,277, Patent 1,297,799
5 Claims. (Cl. 321—5)

This invention relates to a polyphase signal generating circuit which is more particularly intended to generate, from a single-phase voltage of pilot frequency, three-phase square-wave voltages mutually phase-shifted by 120°, together with the three voltages in opposite phase, all these voltages having a constant phase shift with reference to the pilot-frequency voltage.

Such three-phase signals are required, for example, to monitor inverters used as emitters of 175 c.p.s. remote-control signals on high tension lines in electric power distribution networks. As is well known, these signals must not only be frequency stabilized, which implies the use of a master oscillator, but also have rigorously constant and equal phase shifts of 120° relative to the frequency of said master oscillator.

It is the object of this invention to provide a polyphase signal generating circuit whereby three-phase square wave signals which satisfy the two requirements stated hereinbefore can be obtained from the single-phase voltage issuing from the master oscillator. By means of such square wave signals, applied in the manner well known per se to differentiating and rectifying circuits, it is easy to produce suitable positive pulses for monitoring inverters.

A polyphase signal generating circuit according to this invention comprises a first circuit to which is applied the voltage of stabilized frequency $f$ issuing from a master oscillator and which delivers two square wave signals of opposed phase at the frequency $f$, which circuit is followed by a filter which is tuned to the third harmonic of said frequency $f$ and which is connected to a second circuit delivering two square wave signals of opposed phase at the frequency $3f$, the signals issuing from said second circuit being respectively applied, after being differentiated and rectified, to the inputs of three multivibrators the outputs of which are respectively cascade-connected to the inputs of the following multivibrator so that one such input is blocked in one of the two stable states of the preceding multivibrator and open in the other state, and the opposed-phase square wave signals issuing from said first circuit being respectively applied to the inputs of the first multivibrator.

Thus three pairs of square-wave voltages of opposed-phase are obtained at the output from the multivibrators, each pair being phase-shifted by 120° relative to the other two.

The description which follows with reference to the accompanying drawings, filed by way of example only and not of limitation, will give a clear understanding of how the invention may be carried into practice.

Referring to the drawings filed herewith:

Figure 1:
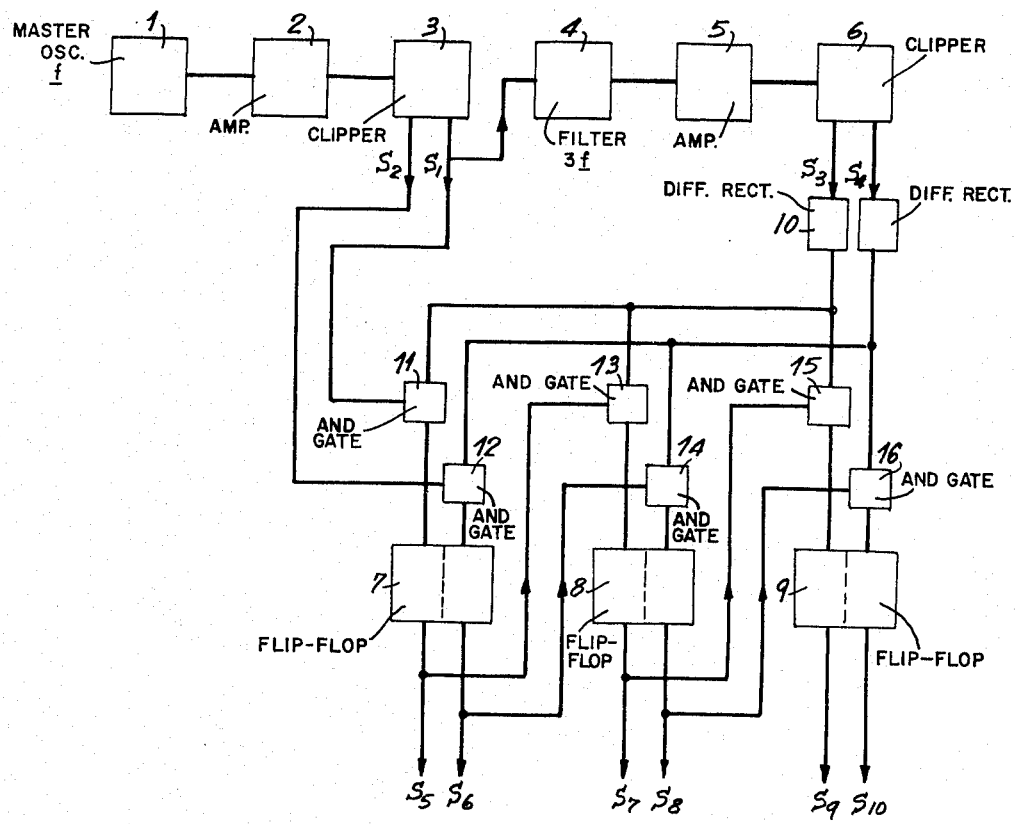
FIGURE 1 is a block diagram of a circuit according to this invention.

Referring now to FIGURE 1, the reference numeral 1 denotes a frequency stabilized master oscillator—of the vibrating blade or tuning fork type, for example—which furnishes a sinusoidal voltage $S_0$ at a frequency $f$. The reference numeral 2 designates an amplifier tuned to the frequency $f$, which amplifier is followed by a clipping amplifier 3 of the Schmitt multivibrator type, say-producing two opposed-phase gating pulse voltages $S_1$ and $S_2$. One of these voltages, $S_1$ for example, which is in opposite phase to the voltage $S_0$ of the oscillator 1, is applied to a filter 4 which is tuned to the frequency $3f$ so as to pass only the third of the harmonics contained in the input voltage $S_1$. This harmonic is amplified in the amplifier 5 tuned to the frequency $3f$, and subsequently enters a clipping amplifier 6 analogous to the circuit 3, which clipping amplifier produces two opposed-phase gating-pulse voltages $S_3$ and $S_4$. The reference numeral 10 designates two differentiating and rectifying circuits which supply a positive pulse for each leading edge of the gating-pulse voltages $S_3$ and $S_4$ applied to them. The reference numerals 7, 8 and 9 denote three bistable multivibrators (flip flops), to the inputs of which are applied the aforementioned positive pulses issuing from the circuit 10, the positive pulses resulting from the differentiation of $S_3$ being applied to the left-hand inputs, those corresponding to $S_4$ to the right-hand inputs. The output voltages from these three multivibrators are respectively designated by $S_5$ and $S_6$ with reference to multivibrator 7, by $S_7$ and $S_8$ with reference to multivibrator 8, and by $S_9$ and $S_{10}$ with reference to multivibrator 9. The six inputs to these multivibrators are adapted to be blocked by gating circuits 11 through 16 respectively, the said gating circuits consisting, for instance, of a capacitor followed by a diode that can be biased by a negative voltage the value of which is greater than that of the input signal voltage. The said gating circuits are connected as follows: the voltages $S_1$, $S_2$ issuing from the circuit 3 are respectively applied to circuits 11 and 12 which cut off the inputs to multivibrator 7, the voltages $S_5$ and $S_6$ issuing from multivibrator 7 to circuits 13 and 14 which cut off the inputs to multivibrator 8, and the voltages $S_7$ and $S_8$ issuing from multivibrator 8 to circuits 15 and 16 which cut off the inputs to multivibrator 9.

The manner of operation of the polyphase signal generating circuit according to the invention will now be explained with reference to the various signal forms indicated in FIGURE 2 wherein time is represented along the abscissa. The master oscillator 1 generates a sinusoidal signal $S_0$ of frequency $f$ which, after amplification in the tuned amplifier 2 and clipping in the clipper-amplifier 3, is converted into two opposed-phase square waveform voltages $S_1$ and $S_2$, the voltage $S_2$ being in phase with the pilot voltage $S_0$. One of these two signals, $S_1$, is applied to filter 4, whence is extracted the third harmonic of frequency $3f$. This harmonic has three times as many zero-crossings as, and is in phase with, the pilot voltage $S_0$. It is amplified by the tuned amplifier 5 and converted into square wave signals in the clipper-amplifier 6 which is analogous to the circuit 3 and which furnishes the two opposed-phase gating-pulse voltages $S_3$ and $S_4$.

Figure 2:
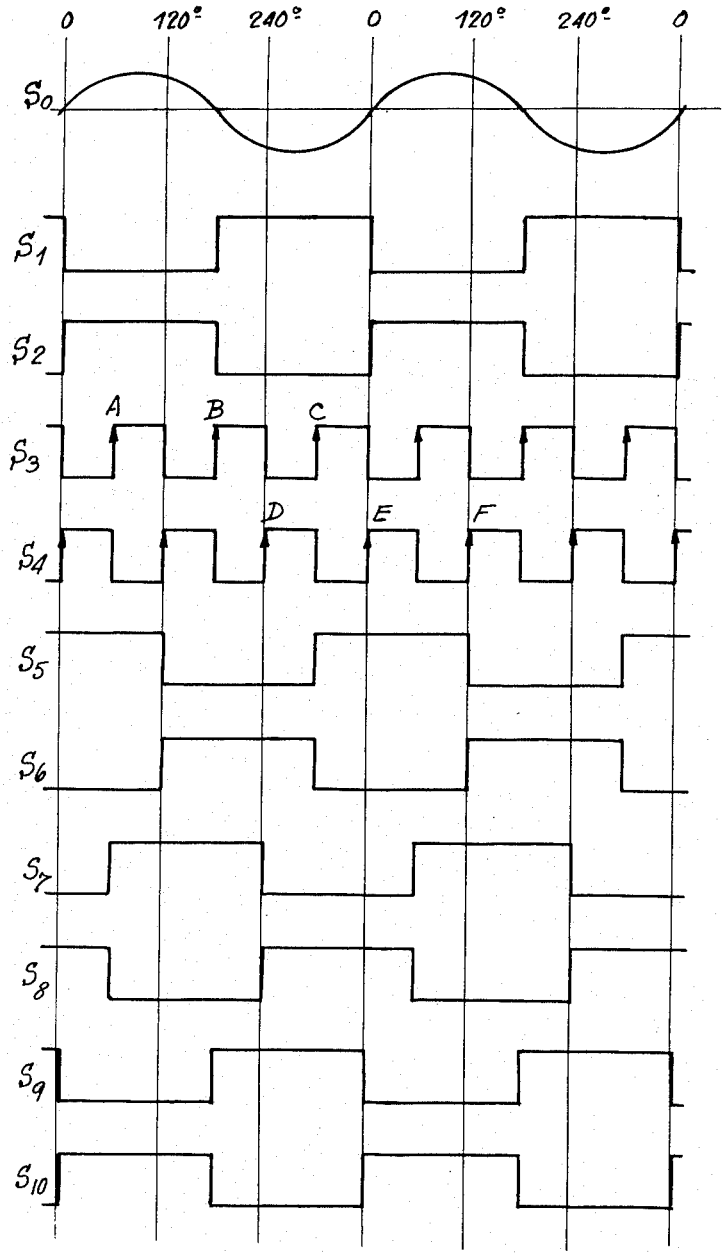
FIGURE 2 shows the shape of the signals at different points in said circuit, in terms of time.

The differentiating and rectifying circuits 10 generate, from the gating-pulse voltages $S_3$ and $S_4$, positive pulses which are designated schematically by arrows in FIGURE 2, examples being A, B, C, D, E, F, corresponding to the leading edges of the said gating pulses. These positive pulses are applied to the inputs of three multivibrators 7, 8 and 9 respectively. All of these pulses, however, cannot cause a change of state in the multivibrators since the action of a part of the pulses is inhibited by the signals applied to the gating circuits 11 through 16. Owing to the fact that the inputs to multivibrator 7 are gated by the gating-pulse voltages $S_1$ and $S_2$ issuing from the circuit 3, only one of the three pulses A, B, C issuing from $S_3$, namely the pulse C which is coincident with the positive gating-pulse of $S_1$, will be susceptible of causing the multivibrator 7 to trip. Similarly, the pulses D and E issuing from $S_4$ are rendered ineffective by the signals $S_2$, and only the pulse F, which is coincident with a positive gating pulse of $S_2$, will produce a reverse tripping of multivibrator 7. The output voltages from multivibrator 7 are represented by the opposed-phase gating pulses $S_5$ and $S_6$, and it may easily be verified that they are phase-shifted by 120° with reference to the signals $S_1$ and $S_2$.

The said signals $S_5$ and $S_6$ are in turn used to cut off the inputs to the next multivibrator 8 which, by a similar process, furnishes two phase-opposed gating-pulse voltages $S_7$ and $S_8$ that are again phase-shifted by 120° with reference to signals $S_5$ and $S_6$, i.e. by 240° with reference to signals $S_1$ and $S_2$. Since the signals $S_7$ and $S_8$ are used in the same manner to cut off the inputs to the last multivibrator 9, there will issue from said multivibrator 9 two phase-opposed gating-pulse voltages $S_9$ and $S_{10}$ which are phase-shifted by 120° with reference to the signals $S_7$ and $S_8$. By reason of this cutting off of two control pulses out of three, three pairs of opposed-phase voltages will issue from the said multivibrators, and each such pair will be phase-shifted rigorously by 120° with reference to the other two pairs.

In this specific method of application of the gating signals, the fact that the gating of certain pulses is effected at the leading edge of a pulse will not prevent it from operating correctly. For, indeed, whereas gating of the pulse A by the voltage $S_1$ raises no difficulty, that of E is effected at the leading edge of the pulse $S_1$. No drawback will ensure therefrom, however, because the effect of the gating devices extends beyond their actual instant of operation, owing to the slow rate of discharge of the capacitors in the gating circuits.

It should be noted that since the signals $S_9$ and $S_{10}$ issuing from the last multivibrator 9 are phase-shifted by three times 120° with reference to the signals $S_1$ and $S_2$, they will theoretically be in phase with the latter, so that the multivibrator 9 could have been dispensed with. However, allowance must be made for the fact that whereas a slight phase-shift between the signals $S_1$, $S_2$ and $S_3$, $S_4$, introduced by the filter 4 in particular, will not prevent proper operation of the gating functions, such a small phase-shift, if it exists, will result in the phase-shifts between the output voltages from the three multivibrators not being regular. By virtue of the presence of multivibrator 9, the phase-shifts between the signals $S_5$, $S_6$, $S_7$, $S_8$ and $S_9$, $S_{10}$ will be rigorously exact multiples of 60°.

Lastly, the voltages $S_5$ through $S_{10}$ are in a defined phase relationship with the pilot voltage, a condition it had been desired to achieve. This requirement is met by reason of the fact that $S_9$ and $S_{10}$ are very substantially in phase with $S_1$ and $S_2$, which are themselves in phase with the pilot voltage $S_0$. As has just been stated, this setting is less accurate that the mutual settings of the various outputs; however, steps may be taken to ensure that these slight phase shifts are reduced to a minimum, in particular by providing compensating means for the temperature variations of the filter 4.

We claim:

1. A polyphase signal generating circuit for connection to a source of alternating current of frequency $f$, comprising:
   (a) first means having an input connectible to the source of alternating current for providing a square wave of frequency $f$;
   (b) second means having an input connectible to the source of alternating current for providing the complement signal of said square wave;
   (c) third means for providing a train of impulses at a frequency which is a multiple of $f$, substantially in phase with said square wave of frequency $f$;
   (d) fourth means for providing a train of impulses at the multiple of frequency $f$, 180° out of phase with the output of said third means;
   (e) a plurality of bistable elements connected in cascade;
   (f) means for applying the outputs of said first and second means to one of said bistable elements; and
   (g) means for applying the outputs of said third and fourth means to all of said bistable elements for causing a square wave of frequency $f$ to be produced at the output of each said bistable element, which square wave is phase-shifted with respect to the outputs of each of the other said bistable elements.

2. A polyphase signal generating circuit comprising: a source of alternating current of frequency $f$, first means connected thereto for producing a square wave of frequency $f$ and its complement signal; second means connected to said first means for producing two pulse trains, each of a frequency which is a multiple of $f$, the phase difference between said pulse trains being 180°, a plurality of bistable elements connected in cascade, means for applying said square wave of frequency $f$ and its complement signal to one of said bistable elements, means for applying one of said two pulse trains at the multiple of frequency $f$ to each of said bistable elements, and means for applying the other of said pulse trains at the multiple of frequency $f$ to each of said bistable elements so that the action of the said square waves on the said pulse trains produces a square wave of frequency $f$ at the output of each said bistable element, phase-shifted with respect to the outputs of each of the other said bistable elements.

3. A polyphase signal generating circuit for connection to a source of alternating current of frequency $f$, comprising:
   (a) means having an input connectible to the source of alternating current for generating a first square wave signal of frequency $f$;
   (b) means having an input connectible to the source of alternating current for generating a second square wave signal complementary to said first square wave signal;
   (c) means for generating a first pulse train of frequency $3f$, substantially in phase with said square wave of frequency $f$;
   (d) means for generating a second pulse train of frequency $3f$, 180° out of phase with said first pulse train;
   (e) first, second and third bistable elements, each having at least two inputs and at least one output;
   (f) means for applying the output and its complement of each said bistable element respectively to two of the inputs of the next succeeding said bistable element;
   (g) means for applying said first and second square wave signals to at least one of said bistable elements; and
   (h) means for applying said first and second pulse trains to each of said bistable elements for causing a square wave of frequency $f$ to be produced at the output of each said bistable element, which square wave is phase-shifted with respect to the outputs of each of the other said bistable elements.

4. A polyphase signal generating circuit, comprising, in combination:
   means for generating a varying pilot voltage at a frequency $f$;
   first circuit means connected to receive said pilot voltage for providing two phase-opposed square wave signals at frequency $f$;
   filter means connected to said first circuit means and tuned to the third harmonic of frequency $f$;
   second circuit means connected to said filter means for providing two phase-opposed square wave signals at a frequency of $3f$;
   three multivibrator means, the outputs of each of which are cascade connected to the respective inputs of the next multivibrator means; and
   means interconnecting said first circuit means, said second circuit means and said multivibrator means for producing at each multivibrator means a square wave 120° out of phase with the square wave produced by any other multivibrator means.

5. A polyphase signal generating circuit for providing from a single-phase pilot voltage three voltages each phase-shifted 120° with respect to the other two and in fixed phase relationship with the pilot voltage, said circuit comprising, in combination:

means for generating a periodically varying pilot voltage at frequency $f$;

first circuit means connected to receive the output of said generating means for providing two phase-opposed square wave signals at frequency $f$;

filter means tuned to pass a frequency $3f$ connected to receive one of said signals generated by said first circuit means;

second circuit means connected to receive the output of said filter means for providing two phase-opposed square wave signals at frequency $3f$;

means connected to said second circuit means for differentiating and rectifying each of the respective signals provided by said second circuit means;

first, second and third multivibrator means, each having first and second inputs and first and second outputs; and six AND-circuits, each having two inputs and one output, the first AND-circuit having one of its inputs connected to receive said one signal provided by said first circuit means and its output connected to the first input of said first multivibrator means, the second AND-circuit having one of its inputs connected to receive the other signal provided by said first circuit means and its output connected to the second input of said first multivibrator means, the third AND-circuit having one of its inputs connected to receive the first output of said first multivibrator means and its output connected to the first input of said second multivibrator means, the fourth AND-circuit having one of its inputs connected to receive the second output of said first multivibrator means and its output connected to the second input of said second multivibrator means, the fifth AND-circuit having one of its inputs connected to receive the first output of said second multivibrator means and its output connected to the first input of said third multivibrator means, the sixth AND-circuit having one of its inputs connected to receive the second output of said second multivibrator means and its output connected to the second input of said third multivibrator means, and the respective other inputs of said first, third and fifth AND-circuits being connected to receive the signals from one of said differentiating and rectifying means and the respective other inputs of said second, fourth and sixth AND-circuits being connected to receive the signals from the other of said differentiating and rectifying means.

References Cited by the Examiner

UNITED STATES PATENTS

| 2,548,737 | 4/1951 | Morris | 331—45 |
| 2,899,572 | 8/1959 | Skelton | 307—88.5 |
| 2,953,735 | 9/1960 | Schmidt | 321—5 |
| 3,041,476 | 6/1962 | Parker | 307—88.5 |
| 3,051,855 | 8/1962 | Lee | 307—88.5 |
| 3,052,833 | 9/1962 | Coolidge et al. | 321—5 |
| 3,091,729 | 5/1963 | Schmidt | 321—5 |

LLOYD McCOLLUM, *Primary Examiner.*

G. J. BUDOCK, J. C. SQUILLARO, M. L. WACHTELL,
*Assistant Examiners.*